United States Patent
Soskind et al.

(10) Patent No.: US 11,775,021 B2
(45) Date of Patent: Oct. 3, 2023

(54) MOISTURE-INSENSITIVE OPTICAL TOUCH SENSORS

(71) Applicant: Apple Inc., Cupertino, CA (US)

(72) Inventors: Yakov G. Soskind, Plainsboro, NJ (US); Mohammad Yeke Yazdandoost, Santa Clara, CA (US); Patrick B. Wright, Edmonton (CA); Giovanni Gozzini, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/404,783

(22) Filed: Aug. 17, 2021

(65) Prior Publication Data

US 2023/0057534 A1 Feb. 23, 2023

(51) Int. Cl.
*G06F 1/16* (2006.01)
*G06F 3/042* (2006.01)
*G01L 1/24* (2006.01)

(52) U.S. Cl.
CPC ............ *G06F 1/1656* (2013.01); *G01L 1/246* (2013.01); *G06F 3/0421* (2013.01); *G06F 2203/04109* (2013.01)

(58) Field of Classification Search
CPC .................. G06F 1/1656; G06F 3/0421; G06F 2203/04109; G01L 1/246
See application file for complete search history.

(56) References Cited

U.S. PATENT DOCUMENTS

| | | | |
|---|---|---|---|
| 9,638,591 B1 | 5/2017 | Sarcia | |
| 10,444,419 B2 | 10/2019 | Bhargava et al. | |
| 10,845,920 B2 | 11/2020 | Smith et al. | |
| 10,866,426 B2 | 12/2020 | Hansotte et al. | |
| 2008/0029691 A1* | 2/2008 | Han | G06F 3/0425 250/221 |
| 2010/0321341 A1* | 12/2010 | Cho | G06F 3/0421 257/E31.127 |
| 2011/0157097 A1 | 6/2011 | Hamada et al. | |

(Continued)

FOREIGN PATENT DOCUMENTS

WO    WO-2020095049 A1 *   5/2020   ............. B42D 25/29

OTHER PUBLICATIONS

U.S. Appl. No. 17/188,946, filed Mar. 1, 2021.

*Primary Examiner* — Patrick N Edouard
*Assistant Examiner* — Joseph P Fox
(74) *Attorney, Agent, or Firm* — Treyz Law Group, P.C.; Kendall P. Woodruff

(57) ABSTRACT

An electronic device may have an optical touch sensor that is insensitive to the presence of moisture. The display may present images through a display cover layer. A light source may illuminate an external object such as a user's finger when the object contacts a surface of the display cover layer. This creates scattered light that may be detected by an array of light sensors. A metasurface grating may be used to couple light from the light source into the display cover layer at an angle such that total internal reflection within the display cover layer is sustained across the display cover layer even when the display cover layer is immersed in water or otherwise exposed to moisture. Additional metasurface gratings may be formed on the display cover layer to redirect light propagating within the display cover layer away from edges that might otherwise defeat total internal reflection.

20 Claims, 15 Drawing Sheets

(56) References Cited

U.S. PATENT DOCUMENTS

| | | | |
|---|---|---|---|
| 2014/0098058 A1* | 4/2014 | Baharav | G06F 3/0421 |
| | | | 345/174 |
| 2014/0168153 A1 | 6/2014 | Deichmann et al. | |
| 2014/0168260 A1* | 6/2014 | O'Brien | G02B 6/00 |
| | | | 385/134 |
| 2016/0077261 A1* | 3/2016 | Arbabi | G02B 5/021 |
| | | | 359/493.01 |
| 2016/0170565 A1* | 6/2016 | Ilmonen | G02B 6/3522 |
| | | | 345/175 |
| 2018/0252857 A1* | 9/2018 | Glik | G02B 6/00 |
| 2020/0004020 A1* | 1/2020 | Bhakta | G02B 27/30 |
| 2020/0166783 A1* | 5/2020 | Roy | G02F 1/0102 |

\* cited by examiner

MOISTURE-INSENSITIVE OPTICAL TOUCH SENSORS

FIELD

This relates generally to electronic devices, and, more particularly, to electronic devices with touch sensors.

BACKGROUND

Electronic devices such as tablet computers, cellular telephones, and other equipment are sometimes provided with touch sensors. For example, displays in electronic devices are often provided with capacitive touch sensors to receive touch input. It can be challenging to operate such sensors in the presence of moisture.

SUMMARY

An electronic device may include an optical touch sensor that is insensitive to the presence of moisture. The optical touch sensor may be a two-dimensional optical touch sensor such as a total internal reflection touch sensor. The optical touch sensor may be used to gather touch input while the electronic device is immersed in water or otherwise exposed to moisture.

An array of pixels in the display may be used to display images. A display cover layer may overlap the array of pixels. A light source may illuminate an external object such as a finger of a user when the object contacts a surface of the display cover layer. This creates scattered light that may be detected by an array of light sensors.

A metasurface grating may be used to couple light from the light source into the display cover layer at an angle such that total internal reflection within the display cover layer is sustained across the display cover layer even when the display cover layer is immersed in water or otherwise exposed to moisture. Additional metasurface gratings may be formed on the display cover layer to redirect light propagating within the display cover layer away from edges that might otherwise defeat total internal reflection.

DETAILED DESCRIPTION

Figure 1:
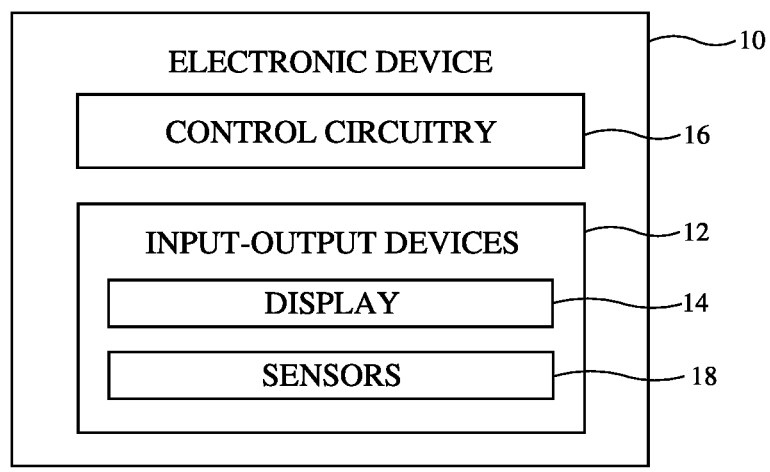
FIG. 1 is a schematic diagram of an illustrative electronic device in accordance with an embodiment.

A schematic diagram of an illustrative electronic device that may include an optical touch sensor is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wristwatch or other device worn on a user's wrist, a pendant device, a headphone or earpiece device, a head-mounted device such as eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Illustrative configurations in which device 10 is a portable device such as a wristwatch, cellular telephone, or tablet computer and, more particularly, a portable device that is water resistant or waterproof may sometimes be described herein as an example.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc. Control circuitry 16 may include communications circuitry for supporting wired and/or wireless communications between device 10 and external equipment. For example, control circuitry 16 may include wireless communications circuitry such as cellular telephone communications circuitry and wireless local area network communications circuitry.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, haptic output devices, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be an organic light-emitting diode display, a display formed from an array of crystalline semiconductor light-emitting diode dies, a liquid crystal display, or other display. Display 14 may be a touch screen display that includes an optical touch sensor for gathering touch input from a user. The optical touch sensor may be configured to operate even when device 10 is immersed in water or otherwise exposed to moisture. If desired, the optical touch sensor may also be configured to operate when a user is wearing gloves, which might be difficult or impossible with some capacitive touch sensors. Moreover, because the optical touch sensor operates optically, the touch sensor is not impacted by grounding effects that might impact the operation of capacitive touch sensors.

As shown in FIG. 1, input-output devices 12 may include sensors 18. Sensors 18 may include touch sensors. Touch sensors may be provided for display 14 and/or other portions of device 10 and may be formed from an array of capacitive touch sensor electrodes, acoustic touch sensor structures, resistive touch components, force-based touch sensor structures, light-based touch sensor structures, or other suitable touch sensor arrangements. Illustrative optical touch sensor arrangements for device 10 (e.g., for display 14 of device 10) are sometimes described herein as an example.

Sensors 18 may include capacitive sensors, light-based proximity sensors, magnetic sensors, accelerometers, force sensors, touch sensors, temperature sensors, pressure sensors, inertial measurement units, accelerometers, gyroscopes, compasses, microphones, radio-frequency sensors, three-dimensional image sensors (e.g., structured light sensors with light emitters such as infrared light emitters configured to emit structured light and corresponding infrared image sensors, three-dimensional sensors based on pairs of two-dimensional image sensors, etc.), cameras (e.g., visible light cameras and/or infrared light cameras), light-based position sensors (e.g., lidar sensors), monochrome and/or color ambient light sensors, and other sensors. Sensors 18 such as ambient light sensors, image sensors, optical proximity sensors, lidar sensors, optical touch sensors, and other sensors that use light and/or components that emit light such as status indicator lights and other light-emitting components may sometimes be referred to as optical components.

Figure 2:
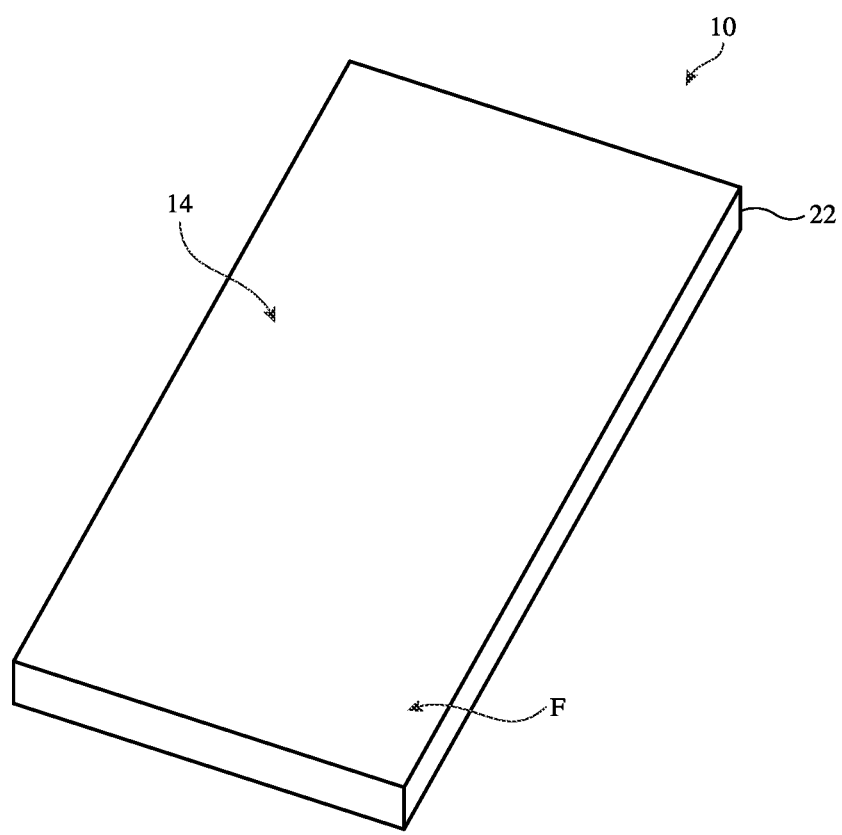
FIG. 2 is a perspective view of an illustrative electronic device in accordance with an embodiment.

A perspective view of an illustrative electronic device of the type that may include an optical touch sensor is shown in FIG. 2. In the example of FIG. 2, device 10 includes a display such as display 14 mounted in housing 22. Display 14 may be a liquid crystal display, a light-emitting diode display such as an organic light-emitting diode display or a display formed from crystalline semiconductor light-emitting diode dies, or other suitable display. Display 14 may have an array of image pixels extending across some or all of front face F of device 10 and/or other external device surfaces. The array of image pixels may be rectangular or may have other suitable shapes. Display 14 may be protected using a display cover layer (e.g., a transparent front housing layer) such as a layer of transparent glass, clear plastic, sapphire, or other clear layer. The display cover layer may overlap the array of image pixels.

Figure 3:
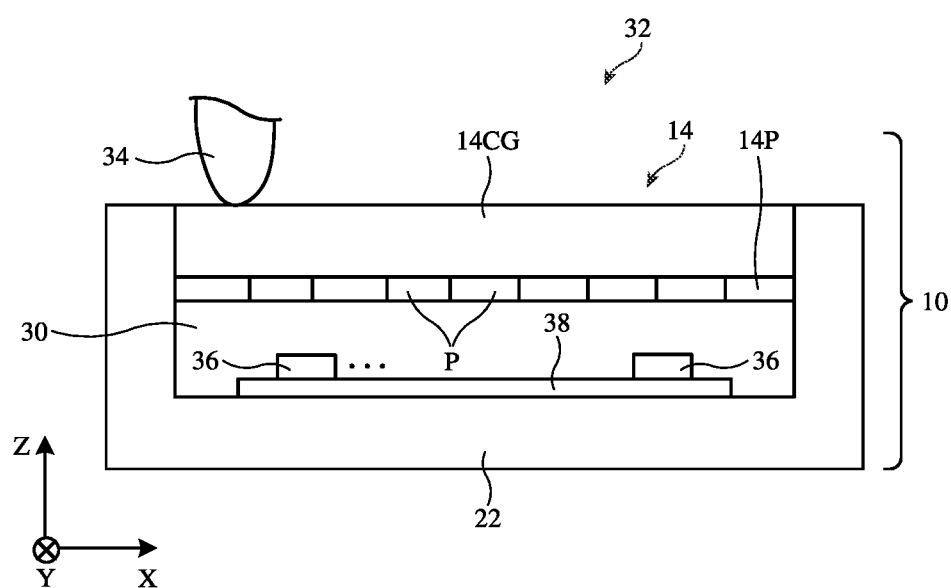
FIG. 3 is a cross-sectional side view of an illustrative electronic device in accordance with an embodiment.

Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. As shown in the cross-sectional side view of device 10 of FIG. 3, housing 22 and display 14 may separate an interior region of device 10 such as interior region 30 from an exterior region surrounding device 10 such as exterior region 32. Housing 22 may be formed using a unibody configuration in which some or all of housing 22 is machined or molded as a single structure or may be formed using multiple structures (e.g., an internal frame structure, one or more structures that form exterior housing surfaces, etc.). If desired, a strap may be coupled to a main portion of housing 22 (e.g., in configurations in which device 10 is a wristwatch or head-mounted device). Internal electrical components 36 (e.g., integrated circuits, discrete components, etc.) for forming control circuitry 16 and input-output devices 12 may be mounted in interior 30 of housing 22 (e.g., on one or more substrates such as printed circuit 38). In some configurations, components 36 may be attached to display 14 (e.g., circuitry may be mounted to the surface of display 14). To obtain touch input from a user's fingers or other external object (see, e.g., user finger 34), display 14 may include a touch sensor such as an optical touch sensor (e.g., a two-dimensional optical touch sensor that gathers information on the XY location of a user's finger or other external object when that object touches the surface of display 14).

Display 14 may include a display panel such as display panel 14P that contains pixels P covered by display cover layer 14CG. The pixels of display 14 may cover all of the front face of device 10 or display 14 may have pixel-free areas (e.g., notches, rectangular islands, inactive border regions, or other regions) that do not contain any pixels. Pixel-free areas may be used to accommodate an opening for a speaker and windows for optical components such as image sensors, an ambient light sensor, an optical proximity sensor, a three-dimensional image sensor such as a structured light three-dimensional image sensor, a camera flash, an illuminator for an infrared image sensor, an illuminator for a three-dimensional sensor such as a structured light sensor, a time-of-flight sensor, a lidar sensor, etc.

Figure 4:
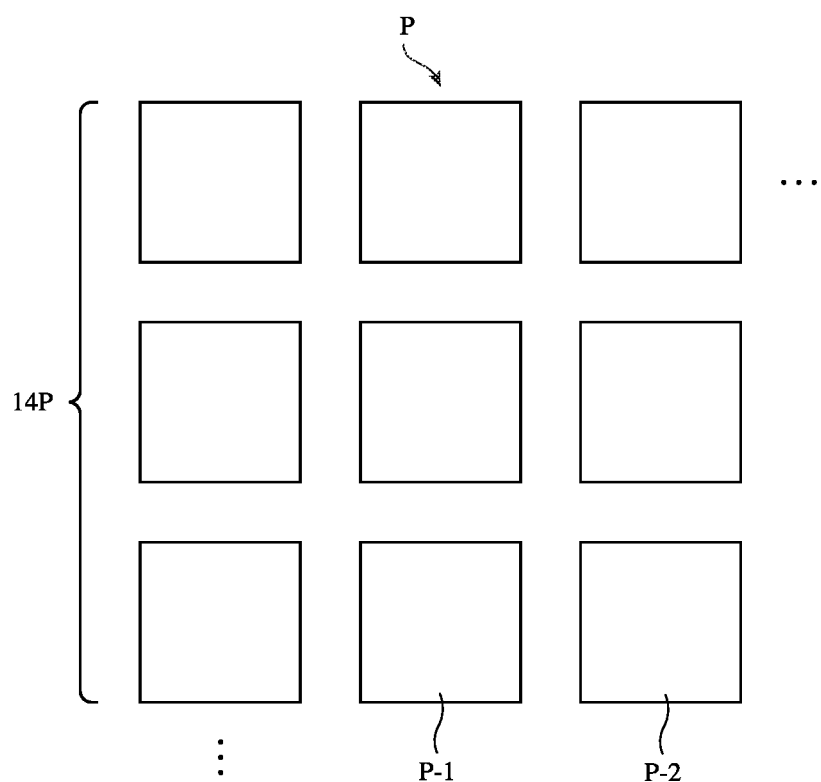
FIG. 4 is a top view of an illustrative array of pixels for an electronic device in accordance with an embodiment.

FIG. 4 is a top view of an array of illustrative pixels P in display panel (display) 14P. As shown in FIG. 4, pixels P may include image pixels such as pixel P-1 that are used in presenting images for a user of device 10. Image pixels in display 14 may, for example, include a rectangular array of red, green, and blue light-emitting diodes or backlight red, green, and blue liquid crystal display pixels for presenting color images to a user.

Pixels P may also contain optical touch sensor pixels such as pixel P-2. Optical touch sensor pixels may include pixels that serve as light detectors and/or light emitters. Emitted light that reflects from a user's finger on the surface of display 14 may be detected using the light detectors, thereby determining the location of the user's finger. If desired, diodes or other components may be used to form pixels that can be operated both as image pixels and as touch sensor pixels. When used as touch sensor pixels, image pixels can be configured to emit optical touch sensor illumination and/or to detect optical touch sensor light. For example, a display emitter can be used to produce image light for a display while also being used to produce optical touch sensor illumination, and/or while also being used to serve as a photodetector for an optical touch sensor.

Image pixels such as pixels P-1 and/or optical touch sensor pixels P-2 may have any suitable pitch. For example, image pixels may have a density that is sufficient to display high-quality images for a user (e.g., 200-300 pixels per inch or more, as an example), whereas optical touch sensor pixels may, if desired, have a lower density (e.g., less than 200 pixel per inch, less than 50 pixels per inch, less than 20 pixels per inch, etc.).

Image pixels emit visible light for viewing by a user. For example, in a color display, image pixels may emit light of different colors of image light such as red, green, and blue light, thereby allowing display 14 to present color images. Optical touch sensor pixels may emit and/or detect visible light and/or infrared light (and/or, if desired, ultraviolet light).

In some configurations, optical touch sensor light for illuminating a user's fingers passes directly through the thickness of display cover layer 14CG from its interior surface to its exterior surface. Optical touch sensors in which light that illuminates the user's fingers passes outwardly from light sources such as light-emitting pixels in display panel 14P directly through the thickness of display cover layer 14CG before being backscattered in the reverse (inward) direction to the light detectors of the optical touch sensors may sometimes be referred to herein as direct illumination optical touch sensors.

In other configurations, light for an optical touch sensor may be provided using edge-coupled light-emitting diodes or other light sources that emit light into the edge surface of display cover layer 14P that is then guided within layer 14CG in accordance with the principal of total internal reflection. For example, a light-emitting diode may emit light into the righthand edge of display cover layer 14CG that is guided from the righthand edge of display cover layer 14CG to the opposing lefthand edge of display cover layer 14CG within the light guide formed by display cover layer 14CG. In this way, light may be guided laterally across layer 14CG in the absence of contact from a user's finger. When a user's finger touches the surface of layer 14CG, total internal reflection can be locally defeated. This local frustration of total internal reflection scatters light inwardly toward the light detectors of the optical touch sensor. Optical touch sensors that are based on locally defeating total internal reflection may sometimes be referred to herein as total internal reflection optical touch sensors. If desired, objects other than the fingers of users (e.g., a computer stylus, a glove, and/or other external objects with appropriate optical properties) may also locally defeat total internal reflection, thereby allowing the optical touch sensors to function over a wide range of operating environments.

Pixels P that emit light and pixels P that detect light in display panel 14P may be formed using shared structures and/or structures that are separate from each other. These structures may be located in the same plane (e.g., as part of a single layer of pixels on a single substrate) and/or may include components located in multiple planes (e.g., in arrangements in which some components are formed in a given layer and other components are formed in one or more additional layers above and/or below the given layer).

Consider, as an example, an optical touch sensor that contains an array of photodetectors formed from reverse-biased diodes. These diodes may be dedicated photodetectors or may be light-emitting didoes that serve as light detectors when reverse biased and that serve as light sources when forward biased. Light sources in the optical touch sensor may include visible light sources (e.g., visible light sources dedicated to use in the optical touch sensor or visible light sources that also serve as image pixels) and/or may include infrared light sources. Light-emitting pixels for the optical touch sensor may be formed from light-emitting diodes (e.g., dedicated light-emitting diodes or diodes that serve as light-emitting diodes when forward biased and that serve as photodetectors when reversed biased). Light-emitting pixels may also be formed from pixels P that are backlit with light from a backlight unit to form backlit pixels (e.g., backlit liquid crystal display pixels). In general, any type of photodetector signal processing circuitry may be used to detect when a photodetector has received light. For example, photodetectors may be configured to operate in a photoresistor mode in which the photodetectors change resistance upon exposure to light and corresponding photodetector signal processing circuitry may be used to measure the changes in photodetector resistance. As another example, the photodetectors may be configured to operate in a photovoltaic mode in which a voltage is produced when light is sensed and corresponding photodetector signal processing circuitry may be used to detect the voltage signals that are output from the photodetectors. Semiconductor photodetectors may be implemented using phototransistors or photodiodes. Other types of photosensitive components may be used, if desired.

Figure 5:
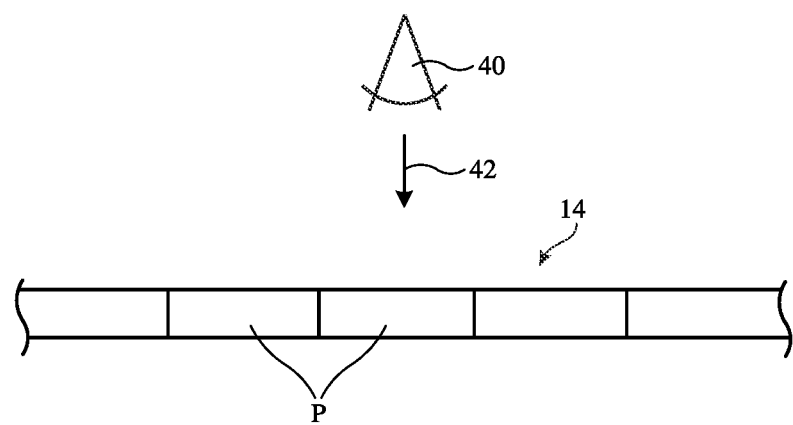
FIGS. 5 and 6 are cross-sectional side views of illustrative pixel arrays for electronic devices in accordance with embodiments.

FIG. 5 is a cross-sectional side view of an illustrative display having an array of pixels P that are not backlit. Pixels P of FIG. 5 may include light-emitting diodes (e.g., organic light-emitting diodes such as thin-film organic light-emitting diodes and/or light-emitting diodes formed from crystalline semiconductor light-emitting diode dies). During operation, image pixels formed from the light-emitting diodes may present an image on display 14 that is visible to a user such as viewer 40 who is viewing display 14 in direction 42.

Figure 6:
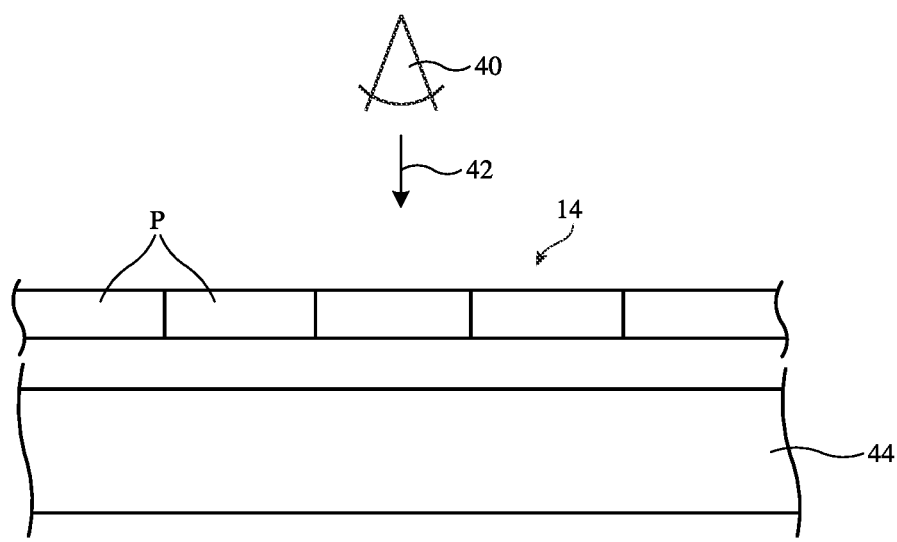

FIG. 6 is a cross-sectional side view of an illustrative display having an array of pixels P that are backlit using backlight unit 44. Backlight unit 44 may include one or more strips of light-emitting diodes that emit light into a backlight unit light guide layer (e.g., a clear optical film with light-scattering structures). As the emitted light propagates through the light guide layer, the scattered light serve as backlight illumination for pixels P (e.g., liquid crystal display pixels). In another illustrative configuration, backlight unit 44 is a direct lit backlight unit that contains an array of backlight light-emitting diodes that provide backlight (e.g., an array-type backlight unit that supports local dimming functionality).

Figure 7:
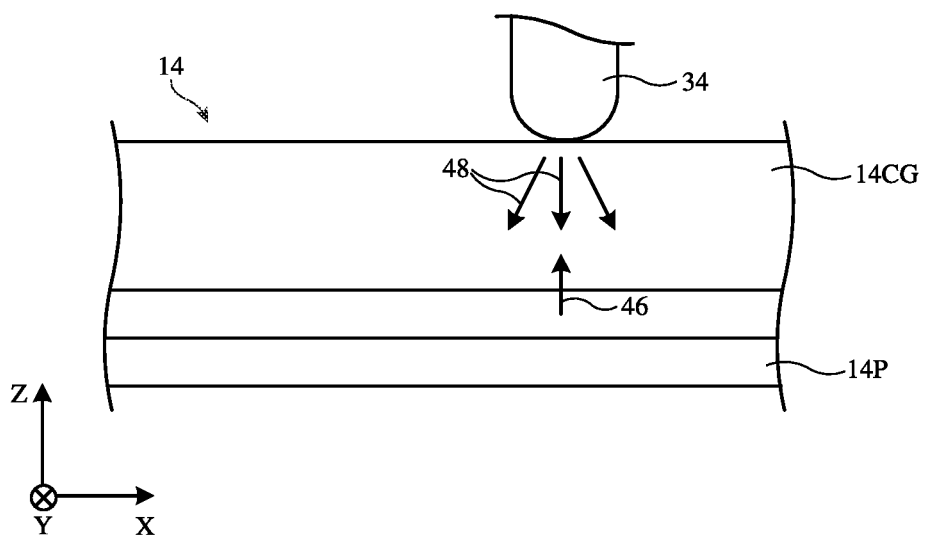
FIG. 7 is a cross-sectional side view of an illustrative optical touch sensor arrangement in accordance with an embodiment.

FIG. 7 is a cross-sectional side view of an illustrative display with a direct illumination optical touch sensor. As shown in FIG. 7, visible and/or infrared light sources associated with display panel 14P may emit illumination 46 that travels directly through display cover layer 14CG from its inner surface to its outer surface, thereby illuminating an external object contacting the surface of display 14 such as finger 34. This creates localized backscattered light 48 that propagates in the inward (−Z) direction and that is detected by photodetectors associated with display panel 14P that are directly below finger 34. In this way, the optical touch sensor can determine the lateral position (XY location) of finger 34.

Figure 8:
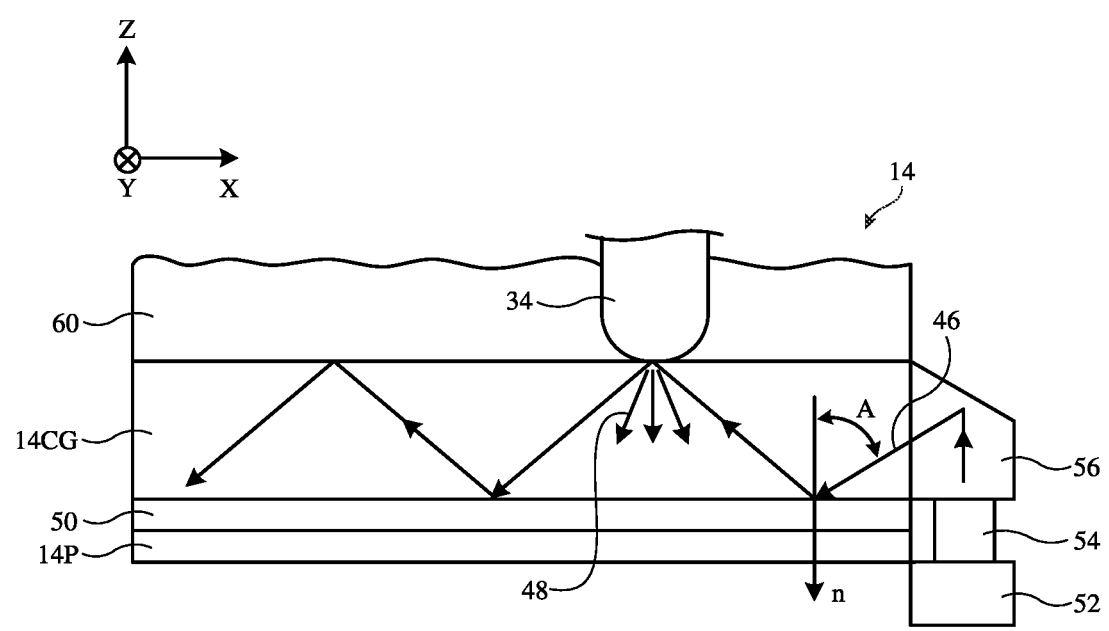
FIG. 8 is a cross-sectional side view of an illustrative optical touch sensor arrangement based on total internal reflection in accordance with an embodiment.

FIG. 8 is a cross-sectional side view of an illustrative display with a total internal reflection optical touch sensor. As shown in FIG. 8, display 14 may include display cover layer 14CG and display panel 14P. Image pixels in panel 14P may display images that are viewable by a viewer through display cover layer 14CG. The outermost surface of display panel 14P may be separated from the opposing innermost surface of display cover layer 14CG by layer 50. Layer 50 may be formed from air, liquid, polymer (e.g., polymer adhesive such as optically clear adhesive, pressure sensitive adhesive, other polymer materials, etc.), glass, other materials, and/or combinations of these materials. Light 46 may be coupled into layer 14CG through the sidewalls of layer 14CG (e.g., at the righthand edge surface at the peripheral of display cover layer 14CG in the example of FIG. 8).

Any suitable optical coupling structures may be used to direct light 46 into display cover layer 14CG. In the example of FIG. 8, light 46 is emitted by a light source such as light source 52. Light source 52 may include one or more light-emitting diodes such as visible or infrared light-emitting diodes or one or more visible or infrared laser diode (e.g., laser diodes such as vertical cavity surface emitting lasers, edge-emitting lasers, or other laser types). Vertical cavity surface emitting diodes may have narrow spectral bandwidth (providing increased signal-to-noise ratio), may have narrow divergence, which reduces scattering from cover layer 14CG), may allow for polarization-based sensing, and may allow for time-gating and/or temporal multiplexing).

Collimator 54 may be used to collimate the emitted light from light source 52 (e.g., to form a beam of light with parallel light rays). A prism such as prism 56 or other optical coupler may be coupled between collimator 54 and display cover layer 14CG. Prism 56 may, for example, be mounted to the edge of display cover layer 14CG to help direct light into the edge of display cover layer 14CG. During operation, optical coupling structures such as collimator 54 and a prism or other optical coupler may be used to couple light 46 that is emitted from light source 52 into the interior of display cover layer 14CG in a beam that is oriented at a desired angle relative to the surfaces of layer 14CG (e.g., at an angle A with respect to surface normal n of display cover layer 14CG). At this angle A, light 46 will propagate within layer 14CG in accordance with the principal of total internal reflection unless total internal reflection is locally defeated by the presence of finger 34 on the outer surface of layer 14CG.

Angle A is selected (and the materials used for layer 14CG and layer 50 are selected) so that light 46 will reflect from the innermost surface of layer 14CG in accordance with the principal of total internal reflection. Layer 14CG may, as an example, have a refractive index n1 (e.g., 1.5 for glass or 1.76 for sapphire as examples), whereas layer 50 may have a refractive index n2 that is less than n1 (e.g., less than 1.5 when layer 14CG is glass or less than 1.76 when layer 14CG is sapphire). The refractive index difference between n1 and n2 may be at least 0.05, at least 0.1, at least 0.2, or other suitable value).

Angle A is also selected so that light 46 will reflect from the uppermost surface of layer 14CG in accordance with the principal of total internal reflection (in the absence of finger 34). In some environments, device 10 will be immersed in water 60 or otherwise exposed to moisture (rain droplets, perspiration, fresh or salt water surrounding device 10 when a user is swimming, etc.). Angle A is preferably selected to ensure that the presence of water 60 will not defeat total internal reflection while ensuring that the presence of finger 34 will locally defeat total internal reflection and thereby produce localized scattered light 48 for detection by the nearby photodetectors of the optical touch sensor. This allows the total internal reflection optical touch sensor to operate whether or not the some or all of the surface of display 14 is immersed in water or otherwise exposed to moisture.

Consider, as an example, a first illustrative scenario in which layer 14CG is formed from a material with a refractive index of 1.5 (e.g., glass). Finger 34 may be characterized by a refractive index of 1.55. Water 60 may be characterized by a refractive index of 1.33. Layer 50 may have a refractive index of less than 1.5. In this first scenario, total internal reflection at the upper surface of layer 14CG when water 60 is present is ensured by the selection of a material for layer 14CG with a refractive index greater than water and by selecting angle A to be greater than the critical angle at the upper surface of layer 14CG (in this example, greater than 62.46°, which is the critical angle associated with total internal reflection at the glass/water interface). To ensure total internal reflection is sustained at the lower surface of layer 14CG, the selected value of A should be greater than the critical angle associated with the lower interface. If, as an example, layer 50 is formed from a material with a refractive index of 1.33 (the same as water) or less, the critical angle associated with the lower interface will be at least 62.46°, so A should be greater than 62.46°. If, on the other hand, layer 50 is formed from a material with a refractive index between 1.33 and 1.5, the critical angle at the lower interface will be increased accordingly and the angle A should be increased to be sufficient to ensure total internal reflection at the lower interface. Regardless of which value is selected for angle A, total internal reflection will be supported at both the lower and upper surfaces of layer 14CG (whether layer 14CG is in air or immersed in water), so long as finger 34 is not present. Because finger 34 has a refractive index (1.55) that is greater than that of layer 14CG (which is 1.5 in this first scenario), whenever finger 34 is present on the upper surface of layer 14CG, total internal reflection will be defeated at finger 34, resulting in scattered light 48 that can be detected by the light detectors of the total internal reflection optical touch sensor associated with display 14.

The refractive index of layer 14CG need not be less than the refractive index of finger 34. Consider, as an example, a second illustrative scenario in which layer 14CG is formed from a crystalline material such as sapphire with a refractive index of 1.76. In this second scenario, the angle A should be selected to be both: 1) sufficiently high to ensure that total internal reflection is sustained at the upper (and lower) surfaces of layer 14CG in the absence of finger 34 (even if water 60 is present) and 2) sufficiently low to ensure that total internal reflection at the upper surface will be locally defeated when finger 34 is touching the upper surface to provide touch input. Total internal reflection at the upper surface may be ensured by selecting a value of A that is greater than the critical angle associated with a sapphire/water interface (e.g., the value of angle A should be greater than arcsin (1.33/1.76), which is 49.08°). Total internal reflection at the lower interface is ensured by selecting a material for layer 50 that has an index of refraction of 1.33 or less (in which case A may still be greater than 49.08°) or by selecting a material for layer 50 that has a larger index (but still less than 1.55) and adjusting the value of A upwards accordingly. To ensure that total internal reflection at the upper surface can be defeated locally by finger 34, the value of angle A should be less than the critical angle associated with a sapphire/finger interface (e.g., less than arcsin (1.55/1.76), which is 61.72°). Thus, in scenarios in which the refractive index of layer 14CG is greater than the refractive index of finger 34, there will be a range of acceptable values for A bounded by a lower limit (e.g., 49.08° in this example) and an upper limit (e.g., 61.72° in this example).

If desired, one or more gratings such as metasurface gratings may be used to couple light from light source 52 into cover layer 14CG and/or to redirect light within cover layer 14CG to ensure that total internal reflection is sustained within cover layer 14CG (e.g., even in the presence of moisture, curved edges of cover layer 14CG, and/or other elements that might otherwise defeat total internal reflection). This type of arrangement is illustrated in FIGS. 9 and 10.

Figure 9:
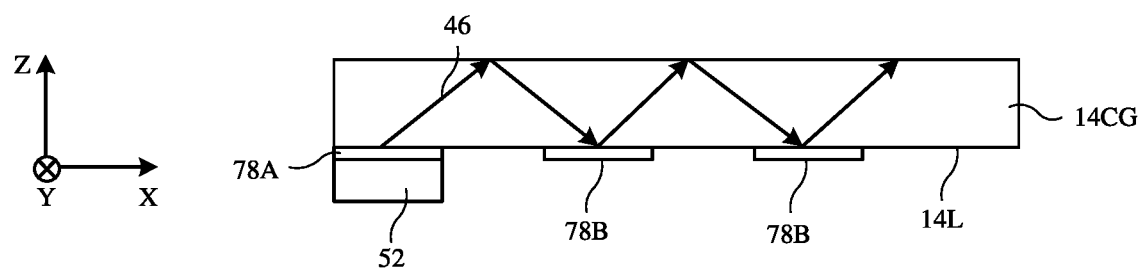
FIG. 9 is a cross-sectional side view of an illustrative optical touch sensor arrangement in which an in-coupling metasurface grating is used to couple light into a display cover layer at a desired angle and one or more additional metasurface gratings are used to redirect light propagating within the display cover layer to sustain total internal reflection within the display cover layer in accordance with an embodiment.

In the example of FIG. 9, light source 52 emits light 46 vertically towards the lower surface 14L of cover layer 14CG (e.g., upwards along the Z-axis of FIG. 9) into grating 78A. Grating 78A may be interposed between the lower surface 14L of cover layer 14CG and light source 52 and may be used to redirect light 46 into cover layer 14CG at the desired angle to achieve total internal reflection within cover layer 14CG (e.g., angle A of FIG. 8). Using grating 78A to couple light directly from light source 52 into cover layer 14CG may eliminate the need for other optical coupling structures (e.g., prisms such as prism 56 of FIG. 8) while also reducing the lateral footprint of the optical touch sensor (e.g., the lateral footprint in the X-Y plane of FIG. 9). Gratings 78A that are used to couple light into cover layer 14CG may sometimes be referred to as in-coupling gratings.

If desired, one or more additional gratings 78B may be formed on the lower surface 14L of cover layer 14CG for redirecting light within cover layer 14CG. For example, gratings 78B may be used to help uniformly distribute light 46 throughout cover layer 14CG and/or to avoid portions of cover layer 14CG that might otherwise defeat total internal reflection such as curved corners, curved edges, etc. Gratings 78B that are used to redirect light within cover layer 14CG may sometimes be referred to as deflecting gratings. In-coupling metasurface gratings 78A may receive light 46 directly from light source 52, whereas deflecting gratings 78B may receive light 46 that is already propagating within cover layer 14CG.

Figure 10:
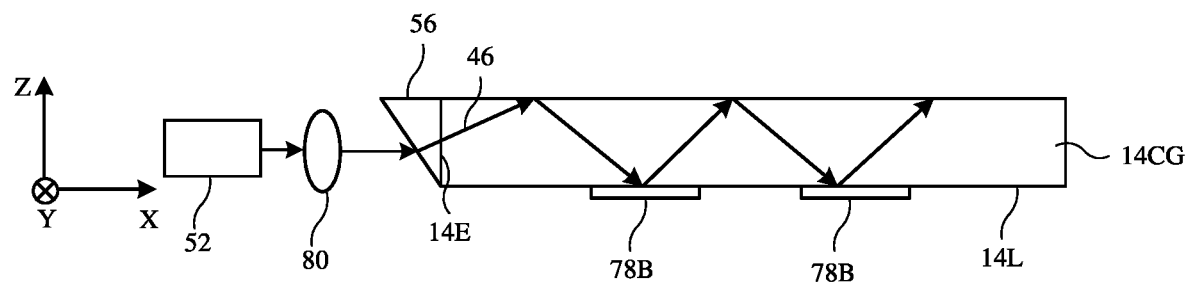
FIG. 10 is a cross-sectional side view of an illustrative optical touch sensor arrangement in which a prism is used to couple light into a display cover layer at a desired angle and in which one or more metasurface gratings are used to redirect light propagating within the display cover layer to sustain total internal reflection within the display cover layer in accordance with an embodiment.

In the example of FIG. 10, optical coupling structures such as prism 56 and/or other optical coupling structures 80 may be used to couple light 46 from light source 52 into edge surface 14E of cover layer 14CG at the desired angle to achieve total internal reflection within cover layer 14CG (e.g., angle A of FIG. 8). One or more gratings 78B may be formed on the lower surface 14L of cover layer 14CG for redirecting light within cover layer 14CG. For example, gratings 78B may be used to help uniformly distribute light 46 throughout cover layer 14CG and/or to avoid portions of cover layer 14CG that might otherwise defeat total internal reflection such as curved corners, curved edges, etc.

Gratings 78A and 78B may be surface-relief gratings, metasurface gratings, volume Bragg polarization gratings, reflective or transmissive gratings, reflective or transmissive volume holograms, etc. Arrangements in which gratings 78A and 78B are metasurface gratings are sometimes described herein as an illustrative example.

Metasurfaces for gratings 78A and 78B may be formed from an array of nanostructures such as silicon pillars or other structures. Metasurface polarization grating couplers may be configured to work independently under different polarizations (e.g., different linear polarization, different circular polarizations, different polarizations of infrared light, etc.). Multiwavelength operation may be supported, if desired.

Figure 11:
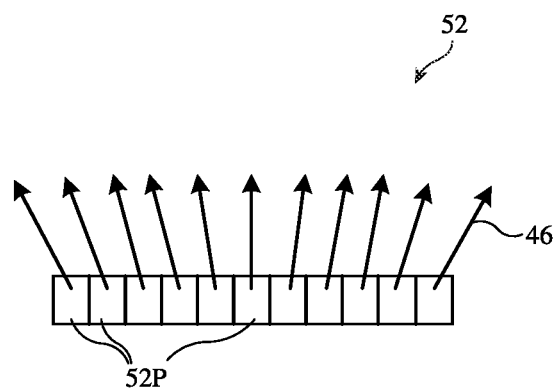
FIG. 11 is a top view of an illustrative light source for an optical touch sensor having a one-dimensional array of light-emitting elements in accordance with an embodiment.
Figure 12:
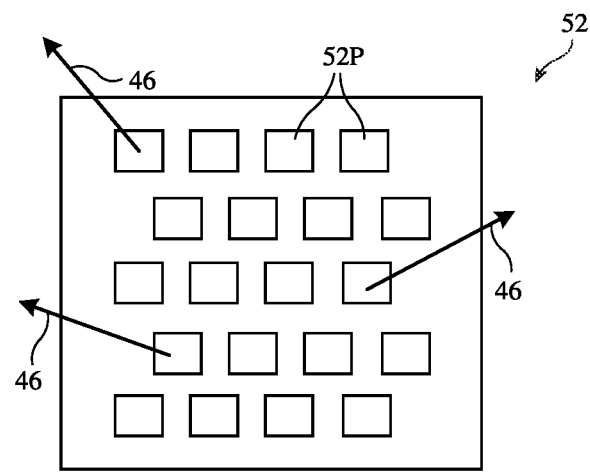
FIG. 12 is a top view of an illustrative light source for an optical touch sensor having a two-dimensional array of light-emitting elements in accordance with an embodiment.

FIGS. 11 and 12 are top views of illustrative light sources 52 that may be used to illuminate an optical touch sensor. In the example of FIG. 11, light source 52 includes a one-dimensional array of light-emitting elements 52P (e.g., a one-dimensional array of laser diodes such as vertical cavity surface emitting lasers or a one-dimensional array of light-emitting diodes). Light-emitting elements 52P may be configured to emit light 46 in different directions (e.g., to create illumination in the shape of a vertically oriented cone), and/or may be configured to emit light 46 in the same direction.

In the example of FIG. 12, light source 52 includes a two-dimensional array of light-emitting elements 52P (e.g., a two-dimensional array of laser diodes such as vertical cavity surface emitting lasers or a two-dimensional array of light-emitting diodes). Light-emitting elements 52P may be configured to emit light 46 in different directions and/or may be configured to emit light 46 in the same direction.

If desired, in-coupling gratings 78A that receive light directly from light source 52 may be tailored to the angles at which light 46 is emitted from light sources 52P (e.g., some metasurface structures in in-coupling grating 78A may be optimized to receive light at a first angle from a first one of light sources 52P while other metasurface structures in the same in-coupling grating 78A may be optimized to receive light at a second angle from a second one of light sources 52P). Tailoring the metasurface structures in in-coupling grating 78A to the angle of light 46 emitted from individual light sources 52P may ensure that light 46 is coupled into cover layer 14CG at the desired angle to achieve total internal reflection (e.g., angle A of FIG. 8). For example, surface-relief metagratings may include nanostructures that are tailored by adjusting the size, shape, spacing, periodicity, angular orientation, and/or material composition of the nanostructures.

FIGS. 13, 14, 15, 16, and 17 are top views of cover layer 14CG showing illustrative examples of different patterns of metasurface gratings 78A and 78B that may be used to couple light into cover layer 14CG and/or to redirect light within cover layer 14CG to sustain total internal reflection in the presence of moisture, curved edges, and/or other elements (besides finger 34) that might otherwise defeat total internal reflection.

Figure 13:
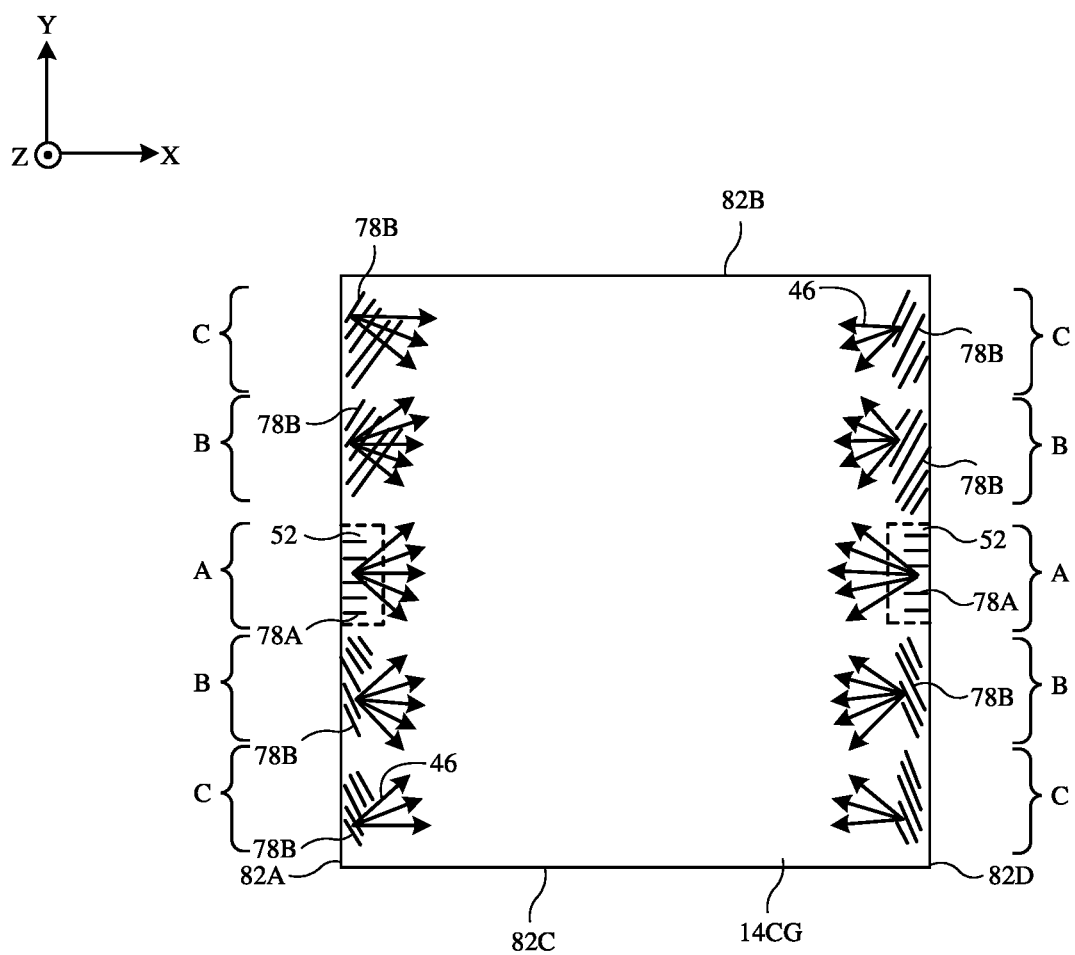
FIGS. 13, 14, 15, and 16 are top views of illustrative optical touch sensors having different patterns of metasurface gratings for coupling light into a display cover layer and redirecting light within the display cover layer to ensure that total internal reflection is sustained within the display cover layer in accordance with embodiments.

In the example of FIG. 13, first and second light sources 52 may be mounted under a lower surface of cover layer 14CG (e.g., lower surface 14L of FIG. 9) and may emit light vertically in the Z-direction of FIG. 13. Light sources 52 may be mounted on opposing sides of cover layer 14CG. For example, a first light source 52 may be mounted adjacent to side 82A of cover layer 14CG, and a second light source 52 may be mounted adjacent to opposing side 82D of cover layer 14CG. Light sources 52 may each include a single light-emitting element (e.g., a single laser diode and/or a single light-emitting diode), may include a one-dimensional array of light-emitting elements (e.g., as in the example of FIG. 11), or may include a two-dimensional array of light-emitting elements (e.g., as in the example of FIG. 12). In-coupling metasurface gratings 78A in regions A may be formed between light sources 52 and the lower surface of cover layer 14CG. If desired, the in-coupling metasurface gratings 78A in regions A may be optimized to receive different angles of light 46 from light sources 52 and to redirect light 46 into cover layer 14CG at the desired angle to achieve total internal reflection (e.g., angle A of FIG. 8). For example, gratings 78A in regions A may receive light 46 that is initially oriented vertically in the Z-direction and may redirect light 46 so that it enters cover layer 46 at the desired angle and propagates within cover layer 14CG along the X-Y plane.

Deflecting metasurface gratings 78B may be formed on the lower surface of cover layer 14CG in regions B and C, with a first set of gratings 78B located along edge 82A and a second set of gratings 78B located along edge 82D. Metasurface gratings 78B in regions B and C may be configured to receive light 46 that has propagated from region A and to redirect light 46 towards the center of cover layer 14CG. The diffraction efficiencies of gratings 78B in regions A, B, and C may be tailored based on the desired illumination homogeneity throughout cover layer 14CG. For example, metasurface gratings 78B in regions B may have a higher diffraction efficiency than metasurface gratings 78A in regions A, and metasurface gratings 78B in regions C may have a higher diffraction efficiency than metasurface gratings 78B in regions B. The diffraction efficiency may vary gradually along each edge 82A and 82D, or the diffraction efficiency may vary in blocks. Gratings 78B in regions C may, if desired, be configured to direct light 46 parallel to and/or away from edges 82B and 82C (e.g., to avoid striking curved edges of cover layer 14CG that might otherwise defeat total internal reflection).

Figure 14:
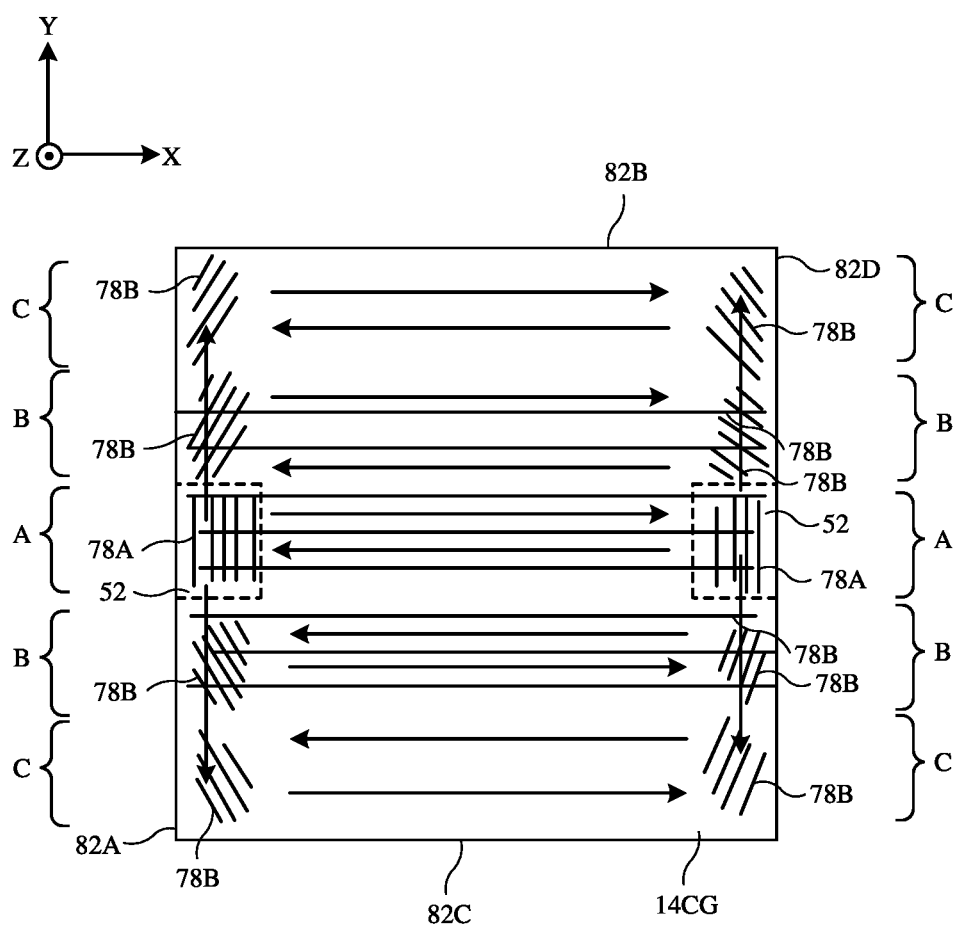

In the example of FIG. 14, first and second light sources 52 may be mounted under a lower surface of cover layer 14CG (e.g., lower surface 14L of FIG. 9) and may emit light vertically in the Z-direction of FIG. 14. Light sources 52 may be mounted on opposing sides of cover layer 14CG. For example, a first light source 52 may be mounted adjacent to side 82A of cover layer 14CG, and a second light source 52 may be mounted adjacent to opposing side 82D of cover layer 14CG. Light sources 52 may each include a single light-emitting element (e.g., a single laser diode and/or a single light-emitting diode), may include a one-dimensional array of light-emitting elements (e.g., as in the example of FIG. 11), or may include a two-dimensional array of light-emitting elements (e.g., as in the example of FIG. 12). In-coupling metasurface gratings 78A in regions A may be formed between light sources 52 and the lower surface of cover layer 14CG. If desired, the in-coupling metasurface gratings 78A in regions A may be optimized to receive different angles of light 46 from light sources 52 and to redirect light 46 into cover layer 14CG at the desired angle to achieve total internal reflection (e.g., angle A of FIG. 8). For example, gratings 78A in regions A may receive light 46 that is initially oriented vertically in the Z-direction and may redirect light 46 so that it enters cover layer 46 at the desired angle and propagates within cover layer 14CG along the X-Y plane.

Deflecting metasurface gratings 78B may be formed on the lower surface of cover layer 14CG in regions B and C, with a first set of gratings 78B located along edge 82A and a second set of gratings 78B located along edge 82D. Metasurface gratings 78B in regions B and C may be configured to receive light 46 that has propagated from region A and to redirect light 46 towards the center of cover layer 14CG. The diffraction efficiencies of gratings in regions A, B, and C may be tailored based on the desired illumination homogeneity throughout cover layer 14CG. For example, metasurface gratings 78B in regions B may have a higher diffraction efficiency than metasurface gratings 78A in regions A, and metasurface gratings 78B in regions C may have a higher diffraction efficiency than metasurface gratings 78B in regions B. The diffraction efficiency may vary gradually along each edge 82A and 82D, or the diffraction efficiency may vary in blocks. Gratings 78B in regions C may, if desired, be configured to direct light 46 parallel to and/or away from edges 82B and 82C (e.g., to avoid striking curved edges of cover layer 14CG that might otherwise defeat total internal reflection).

In addition to gratings 78A and 78B in regions A, B, and C, cover layer 14CG may include gratings 78B across the center of cover layer 14CG (e.g., extending between side 82A and 82D). Gratings 78B that extend across the width of cover layer 14CG may receive light 46 from gratings 78A and 78B in regions A, B, and C and may redistribute the light 46 throughout cover layer 14CG.

Figure 15:
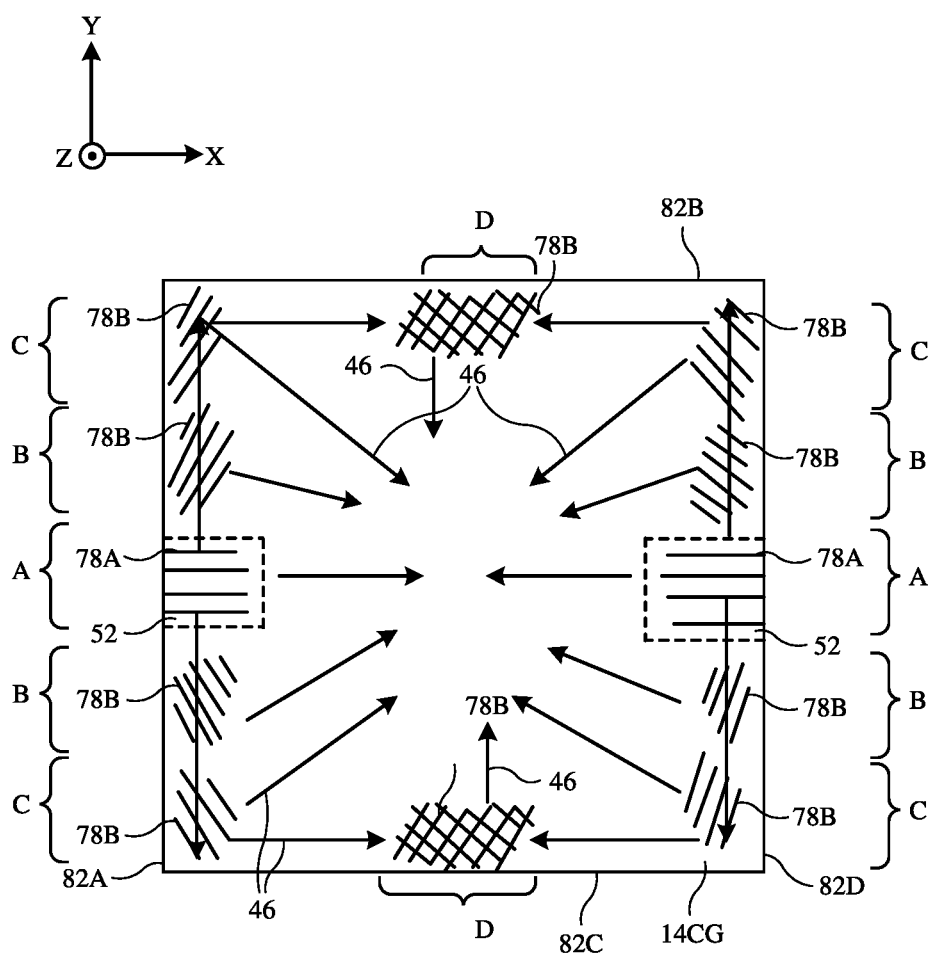

In the example of FIG. 15, first and second light sources 52 may be mounted under a lower surface of cover layer 14CG (e.g., lower surface 14L of FIG. 9) and may emit light vertically in the Z-direction of FIG. 15. Light sources 52 may be mounted on opposing sides of cover layer 14CG. For example, a first light source 52 may be mounted adjacent to side 82A of cover layer 14CG, and a second light source 52 may be mounted adjacent to opposing side 82D of cover layer 14CG. Light sources 52 may each include a single light-emitting element (e.g., a single laser diode and/or a single light-emitting diode), may include a one-dimensional array of light-emitting elements (e.g., as in the example of FIG. 11), or may include a two-dimensional array of light-emitting elements (e.g., as in the example of FIG. 12). In-coupling metasurface gratings 78A in regions A may be formed between light sources 52 and the lower surface of cover layer 14CG. If desired, the in-coupling metasurface gratings 78A in regions A may be optimized to receive different angles of light 46 from light sources 52 and to redirect light 46 into cover layer 14CG at the desired angle to achieve total internal reflection (e.g., angle A of FIG. 8). For example, gratings 78A in regions A may receive light 46 that is initially oriented vertically in the Z-direction and may redirect light 46 so that it enters cover layer 46 at the desired angle and propagates within cover layer 14CG along the X-Y plane.

Deflecting metasurface gratings 78B may be formed on the lower surface of cover layer 14CG in regions B and C, with a first set of gratings 78B located along edge 82A and a second set of gratings 78B located along edge 82D. Metasurface gratings 78B in regions B and C may be configured to receive light 46 that has propagated from region A and to redirect light 46 towards the center of cover layer 14CG. The diffraction efficiencies of gratings in regions A, B, and C may be tailored based on the desired illumination homogeneity throughout cover layer 14CG. For example, metasurface gratings 78B in regions B may have a higher diffraction efficiency than metasurface gratings 78A in regions A, and metasurface gratings 78B in regions C may have a higher diffraction efficiency than metasurface gratings 78B in regions B. The diffraction efficiency may vary gradually along each edge 82A and 82D, or the diffraction efficiency may vary in blocks. Gratings 78B in regions C may, if desired, be configured to direct light 46 parallel to and/or away from edges 82B and 82C (e.g., to avoid striking curved edges of cover layer 14CG that might otherwise defeat total internal reflection).

In addition to gratings 78A and 78B in regions A, B, and C, cover layer 14CG may include gratings 78B in regions D, with a first grating 78B located along edge 82B and a second grating 78B located along edge 82C. Gratings 78B in regions D may receive light 46 from gratings 78B in regions C and may redirect the light 46 towards the center of cover layer 14CG. Gratings 78B in regions D may, if desired, be configured to direct light 46 away from edges 82B and 82C (e.g., to avoid striking curved edges of cover layer 14CG that might otherwise defeat total internal reflection).

Figure 16:
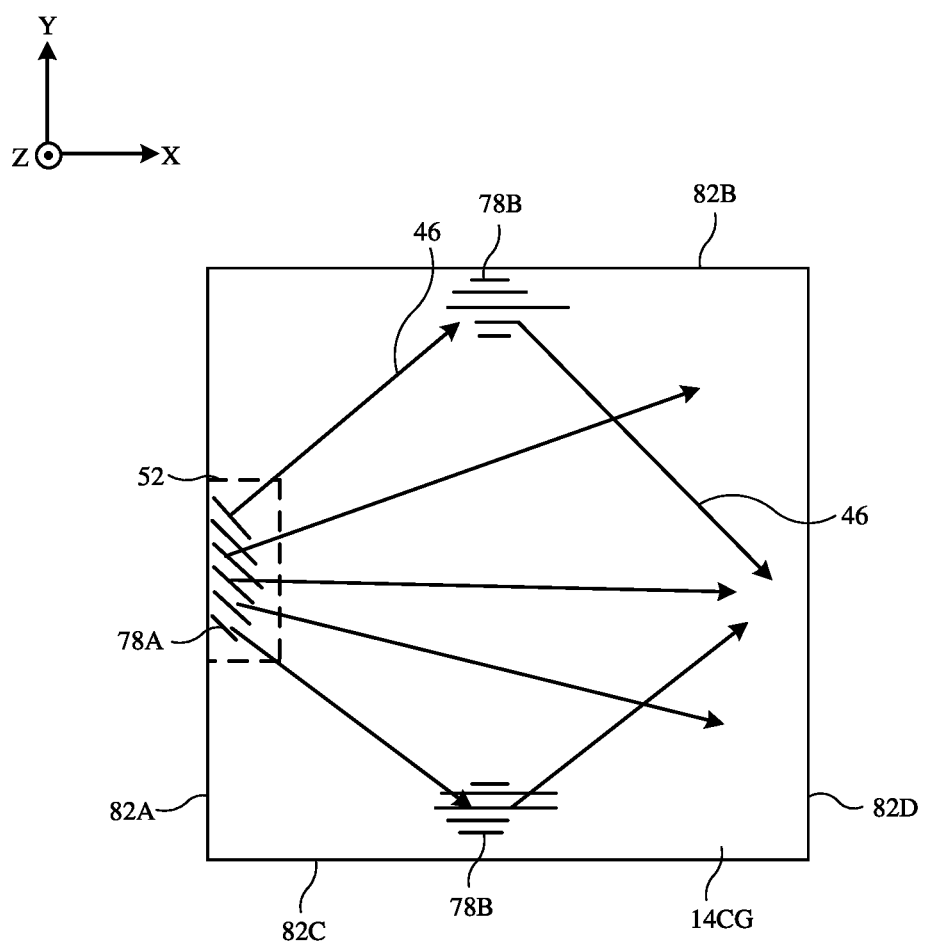

In the example of FIG. 16, light source 52 may be mounted under a lower surface of cover layer 14CG (e.g., lower surface 14L of FIG. 9) and may emit light vertically in the Z-direction of FIG. 15. Light source 52 may be mounted adjacent to side 82A of cover layer 14CG. Light source 52 may include a single light-emitting element (e.g., a single laser diode and/or a single light-emitting diode), may include a one-dimensional array of light-emitting elements (e.g., as in the example of FIG. 11), or may include a two-dimensional array of light-emitting elements (e.g., as in the example of FIG. 12). In-coupling metasurface grating 78A may be formed between light source 52 and the lower surface of cover layer 14CG. If desired, in-coupling metasurface grating 78A between light source 52 and cover layer 14CG may extend along all or some of side 82A and may be optimized to receive different angles of light 46 from light source 52 and to redirect light 46 into cover layer 14CG at the desired angle to achieve total internal reflection (e.g., angle A of FIG. 8). For example, grating 78A between light source 52 and cover layer 14CG may receive light 46 that is initially oriented vertically in the Z-direction and may redirect light 46 so that it enters cover layer 46 at the desired angle and propagates within cover layer 14CG along the X-Y plane.

Deflecting metasurface gratings 78B may be formed on the lower surface of cover layer 14CG and may extend along one or more sides of cover layer 14CG. In the example of FIG. 16, one grating 78B is located adjacent to side 82B of cover layer 14CG and another grating 78B is located adjacent to side 82C of cover layer 14CG. Gratings 78B may extend along only a portion of sides 82B and 82C (e.g., as shown in the example of FIG. 16), or may each extend along the entire side of cover layer 14CG. Metasurface gratings 78B along edges 82B and 82C may be configured to receive light 46 that has propagated from grating 78A on side 82A and to redirect light 46 towards the center of cover layer 14CG.

Figure 17:
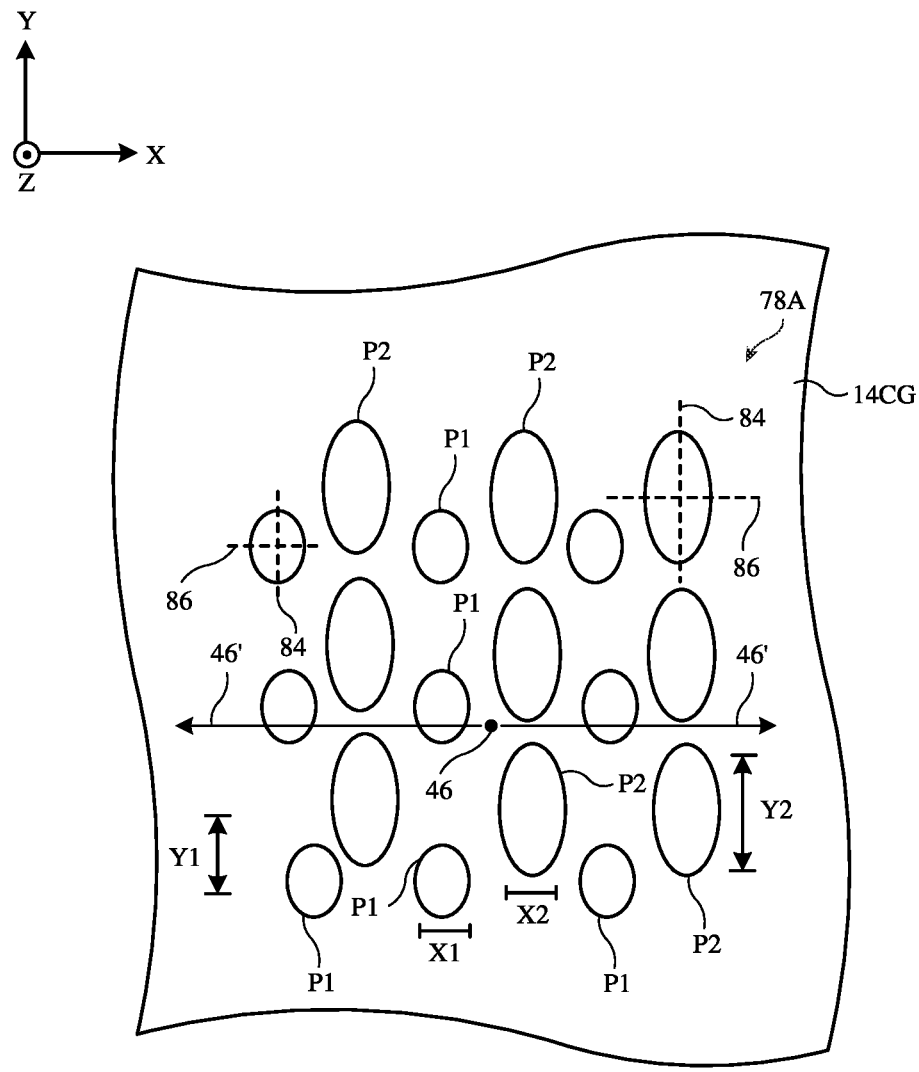
FIG. 17 is a top view of illustrative nanostructures that may be used in a metasurface grating to couple light into a display cover layer at a desired angle in accordance with an embodiment.

FIG. 17 is a top view of an illustrative in-coupling grating 78A formed from a metasurface structure (sometimes referred to as a metasurface grating). As shown in FIG. 17, metasurface grating 78A may have nanostructures P1 and P2 that extend in a two-dimensional array across the surface of cover layer 14CG (e.g., in lateral dimensions X and Y of FIG. 17). Nanostructures P1 and P2 may be nanoposts (nanopillars) such as elliptical nanoposts, rectangular nanoposts, circular nanoposts, or nanoposts of other shapes. Nanostructures P1 and P2 may be formed from any suitable material (e.g., semiconductors, organic and/or inorganic dielectrics, metals, other materials, and/or combinations of materials). As an example, nanostructures P1 and P2 may be formed from polycrystalline silicon or amorphous silicon, which have high refractive indices. Nanostructures P1 and P2 may also be formed from high refractive index dielectric materials that are transparent at visible wavelengths, such as titanium dioxide (TiO2). If desired, the metagratings may be encapsulated with a lower refractive index material (e.g., polymeric materials of silicon dioxide (SiO2) and/or other materials) to protect the nanostructures from contamination and/or accidental damage.

Grating 78A may include different types (e.g., different shapes, sizes, materials, spacing, etc.) of nanostructures that are organized in a random pattern without repeating elements (or other irregular and non-periodic pattern) or that are organized in a two-dimensional repeating pattern to form an array of nanostructures for grating 78A. In the example of FIG. 17, in-coupling grating 78A includes two types of nanostructures P1 and P2. Nanostructure P1 has dimensions X1 and Y1 along lateral dimensions X and Y, respectively. Nanostructure P2 has dimensions X2 and Y2 along lateral dimensions X and Y, respectively. Dimension X1 may be smaller than dimension X2 and smaller than dimension Y1. Dimension Y1 may be smaller than dimension Y2, and dimension X2 may be smaller than dimension Y2. Nanostructures P1 and P2 have elliptical shapes in the example of FIG. 17, which may increase the diffraction efficiency of grating 78A relative to other shapes. Other factors that may be changed to adjust the diffraction efficiency of grating 78A include the spacing between nanostructures P1 and P2, the height of nanostructures P1 and P2, and the type of materials used to form P1 and P2 (e.g., a high refractive index material and an encapsulant). This is merely illustrative, however. Other shapes may be used for nanostructures P1 and P2, if desired.

Each elliptical nanostructure P1 and P2 may have a major axis 84 and a minor axis 86. The angular orientation of major axes 84 of nanostructures P1 and P2 may determine the direction at which light is output for a given incident angle. In some arrangements, it may be desirable to direct half of incoming light 46 in a first direction and the other half of incoming light in a second, opposite direction. When it is desired to split the light fifty-fifty in opposite directions, major axes 84 of nanostructures P1 and P2 may be parallel to one another, and minor axes 86 of nanostructures P1 and P2 may be parallel to one another. For example, grating 78A may serve as an in-coupling grating that receives light 46 initially parallel to the Z-axis of FIG. 17 and that redirects half of incident light 46 in the positive X direction within cover layer 14CG (output light 46') and the other half of incident light 46 in the negative X direction within cover layer 14CG (output light 46'). To achieve this, major axes 84 of nanostructures P1 and P2 may be aligned with the Y dimension of FIG. 17 and minor axes 86 of nanostructures P1 and P2 may be aligned with the X dimension of FIG. 17. For a given selection of nanostructure materials and the wavelength of the incoming light, the amount of in-coupled light propagating in the positive and negative X directions may be optimized by adjusting the size and ellipticity of the nanostructures. If desired, nanostructures having an arrangement of the type shown in FIG. 17 may be used for in-coupling gratings 78A in any of the examples shown in FIGS. 13, 14, 15, and 17, and/or may be used for in-coupling gratings 78A in other types of arrangements.

The example of FIG. 17 in which there are two types of nanostructures P1 and P2 in grating 78A is merely illustrative. If desired, grating 78A may include a third type of nanostructure and/or may include more than three types of nanostructures. The third type of nanostructure may have smaller or larger dimensions than P1 and P2. In one illustrative arrangement, the third type of nanostructure may be an elliptical post having smaller dimensions than P1. If desired, the major axis of the third type of nanostructure may be parallel to major axis 84 of P1 and P2. Configurations of this type may be used to in-couple all of incident light 46 (initially parallel to the Z-dimension of FIG. 17) in a single direction within cover layer 14CG (e.g., parallel to the X-dimension of FIG. 17). This is merely illustrative, however. Nanostructures within grating 78A may have any suitable orientation relative to one another, depending on the incident angle and the desired output angle.

Figure 18:
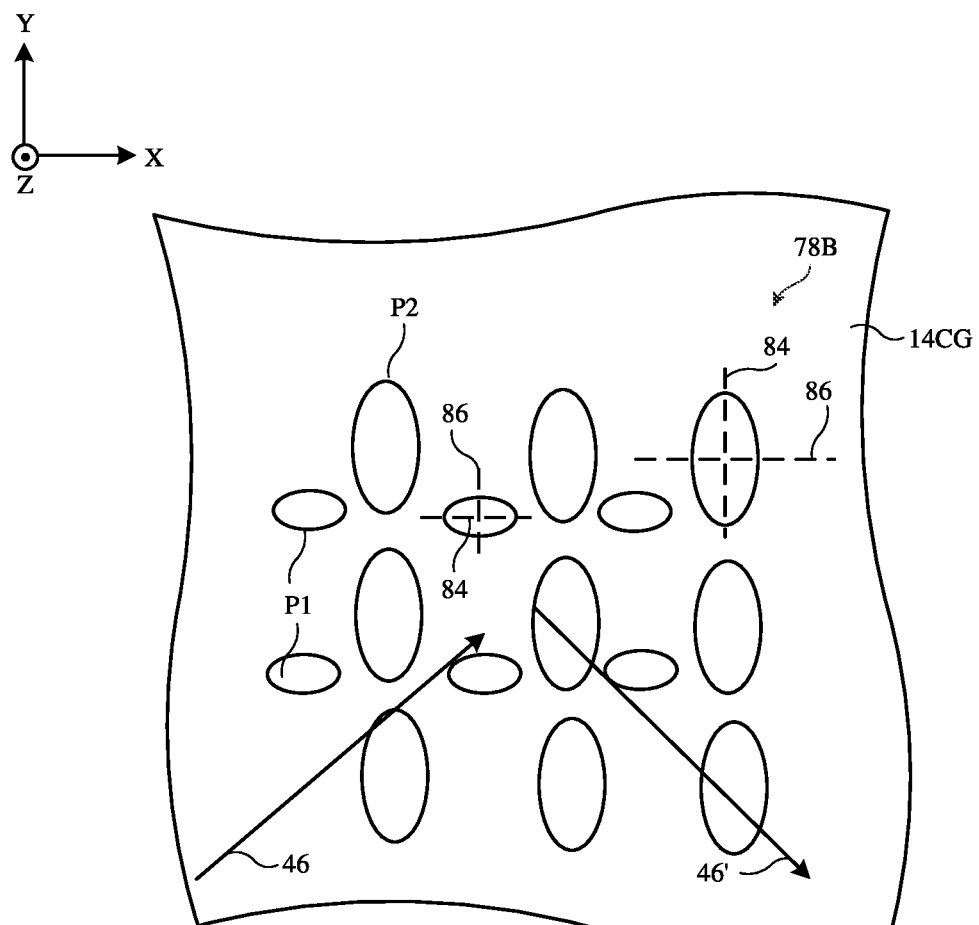
FIG. 18 is a top view of illustrative nanostructures that may be used in a metasurface grating to redirect light propagating within a display cover layer in accordance with an embodiment.

FIG. 18 is a top view of grating 78B having metasurface structures for redirecting light that is already propagating within cover layer 14CG. For example, grating 78B of FIG. 18 may be used as a deflecting grating in any of the examples shown in FIGS. 13, 14, 15, and 17, and/or in other types of arrangements.

As shown in FIG. 18, metasurface grating 78B may have nanostructures P1 and P2 that extend in a two-dimensional array across the surface of cover layer 14CG (e.g., in lateral dimensions X and Y of FIG. 18). Similar to the example of FIG. 17, grating 78B includes two types of nanostructures P1 and P2. Nanostructure P1 has dimensions X1 and Y1 along lateral dimensions X and Y, respectively. Nanostructure P2 has dimensions X2 and Y2 along lateral dimensions X and Y, respectively. Dimension X1 may be smaller than dimension X2 and smaller than dimension Y1. Dimension Y1 may be smaller than dimension Y2, and dimension X2 may be smaller than dimension Y2. Nanostructures P1 and P2 have elliptical shapes in the example of FIG. 18, which may increase the diffraction efficiency of grating 78B relative to other shapes. This is merely illustrative, however. Other shapes may be used for nanostructures P1 and P2, if desired.

Each elliptical nanostructure P1 and P2 may have a major axis 84 and a minor axis 86. The angle between the incoming light and axes 84 and 86 of respective nanostructures P1 and P2 may determine the direction at which light is redirected after interacting with the metagratings. In some arrangements, it may be desirable to deflect light at 90-degree angles. To deflect the light at a right angle, major axes 84 of nanostructures P1 and P2 may be perpendicular to one another, minor axes 86 of nanostructures P1 and P2 may be perpendicular to one another, and the angle between the incoming light 46 and axes 84 and 86 of respective nanostructures P1 and P2 is selected to be 45 degrees. For example, grating 78B may serve as a deflecting grating that receives incident light 46 propagating within cover layer 14CG and that redirects the light at 90 degrees to a different region of cover layer 14CG (see output light 46' of FIG. 18). To achieve this, minor axis 86 of nanostructures P1 and major axis 84 of nanostructures P2 may be aligned with the Y dimension of FIG. 18, and major axis 84 of nanostructures P1 and minor axis 86 of nanostructures P2 may be aligned with the X dimension of FIG. 18, while the azimuthal direction of the incident light 46 within the top view of the cover layer 14CG is 45 degrees, as shown in FIG. 18.

The example of FIG. 17 in which the major axes 84 of elliptical nanostructures P1 and P2 are parallel to one another and the example of FIG. 18 in which the major axes 84 of elliptical nanostructures P1 and P2 are perpendicular to one another are merely illustrative. If desired, the angle between the major axes 84 of nanostructures P1 and P2 may be between 0 and 90 degrees, may be greater than 90 degrees, and/or may have any other suitable angle, depending on the input angle and the desired output angle.

If desired, other properties of gratings 78A and 78B may be varied to achieve the desired light distribution effect within cover layer 14CG. Illustrative properties of grating 78A and 78B that may be varied to achieve the desired light distribution effect include periodicity in the X direction, periodicity in the Y direction, dimensions X1, Y1, X2, and Y2, the shape, size, material, and/or other property of nanostructures within grating 78A (e.g., P1 and P2), the number of different types of nanostructures within grating 78A and/or grating 78B (e.g., grating 78A and/or grating 78B may include two different types of nanostructures such as P1 and P2, may include only one type of nanostructure, may include more than two types of nanostructures, etc.), etc. Properties of gratings 78A and 78B may be varied continuously (for a gradient effect) or may be varied in sections (e.g., block-by-block portions of grating 78A and/or grating 78B). Properties of grating 78A and/or grating 78B may, for example, be varied along the length of one or more edges of cover layer 14CG and/or may be varied across the region overlapping light source 52 (e.g., a first set of nanostructures having a first set of properties may be optimized to receive light at a first incident angle from a first light-emitting element in the light source, a second set of nanostructures having a second set of properties may be optimized to receive light at a second incident angle from a second light-emitting element in the light source, a third set of nanostructures having a third set of properties may be optimized to receive light at a third incident angle from a third light-emitting element in the light source, etc.).

If desired, nanostructures such as nanostructures P1 and P2 of FIGS. 17 and 18 may be formed using high resolution optical projection lithography, nano-imprint lithography, and/or other suitable fabrication techniques.

Nanostructures such as nanostructures P1 and P2 of FIGS. 17 and 18 may be designed to operate at a nominal wavelength 940 nanometers, or may be designed to operate at shorter wavelengths, including wavelengths in the visible spectrum, longer wavelengths in the infrared spectrum, and/or other suitable wavelengths.

One illustrative parameter that may be adjusted to optimize nanostructures in gratings 78A and 78B is the ellipticity of nanostructures P1 and P2. Ellipticity may be defined as the ratio of the length of minor axis 86 to the length of major axis 84.

For example, in arrangements where nanopillars P1 and P2 of FIG. 17 are composed of amorphous silicon without an encapsulation layer, nanopillars P1 and P2 may have a height of 536 nm, may have a periodicity of 688 nm in the X direction, may have a periodicity of 460 nm in the Y direction, and may have ellipticities of 0.75 and 0.82, respectively. This is merely illustrative, however. If desired, nanopillars P1 and P2 of FIG. 17 may be formed with different materials, heights, periodicities, and ellipticities. Ellipticity values may range from 0.3 to 1.0, for example, and may depend on the refractive indices of the nanostructures and the encapsulation material (if any), height, and periodicity in the two lateral directions. The lengths of the minor and major axes for nanostructures P1 and P2 in FIG. 17 (e.g., dimensions X1, Y1, X2, and Y2) may be 231 nm, 306 nm, 164 nm, and 199 nm, respectively (as illustrative examples). If desired, dimensions X1, Y1, X2, and Y2 may range from 80 nm to 450 nm, depending on the refractive indices of the nanostructure material and the encapsulation material (if any), height, and periodicity in the two lateral directions.

Nanostructures such as nanopillars P1 and P2 of FIG. 18 may be designed to exhibit diffraction efficiencies between 1% and 100%. In arrangements where nanostructures P1 and P2 of FIG. 18 are formed from amorphous silicon without encapsulation layer and are designed to exhibit 50% diffraction efficiency and to redirect the light at an angle of 90 degrees, nanostructures P1 and P2 may have a height of 536 nm, a periodicity of 486 nm in the X dimension, and a periodicity of 326 nm in the Y dimension. This is merely illustrative, however. Nanostructures P1 and P2 may have other suitable heights and periodicity values. The lengths of the minor and major axes of nanostructures P1 and P2 in FIG. 18 may be 170 nm, 224 nm, 171 nm, and 186 nm, respectively (as illustrative examples). The lengths of the minor and major axes of nanostructures P1 and P2 may range from 80 nm to 450 nm, depending on the refractive indices of the nanostructures and the encapsulation material (if any), height, and periodicity in the two lateral directions. The ellipticities of the nanostructures P1 and P2 of FIG. 18 may be 0.76 and 0.92, for example. Different ellipticity values may be used (e.g., ranging from 0.3 to 1.0), depending on the refractive indices of nanostructure material and encapsulation material (if any), the redirection angle, the nanostructure height, and the metagrating periodicity in two lateral directions.

The foregoing is merely illustrative and various modifications can be made to the described embodiments. The foregoing embodiments may be implemented individually or in any combination.

| Table of Reference Numerals | | | |
|---|---|---|---|
| 10 | Electronic device | 12 | Input-output devices |
| 14 | Display | 18 | Sensors |
| 16 | Control circuitry | 22 | Housing |
| P, P-1, P-2 | Pixels | 30 | Interior Region |
| F | Front face | 36 | Components |
| 32 | Exterior region | 38 | Substrate |
| 14P | Display Panel | 14CG | Display Cover Layer |
| 34 | Finger | 40 | Viewer |
| 42 | Direction | 44 | Backlight unit |
| 46, 46', 48 | Light | 50 | Layer |
| A | Angle | 60 | Water |
| n | Surface Normal | 52 | Light Source |
| 54 | Collimator | 56 | Prism |
| 78A, 78B | Grating | 80 | Optical Coupling Structure(s) |
| 82A, 82B, 82C, 82D | Side | 84 | Major Axis |
| 86 | Minor Axis | P1, P2 | Nanostructure |
| X1, X2, Y1, Y2 | Dimension | A, B, C, D | Region |

The invention claimed is:

1. An electronic device, comprising:
a display;
a display cover layer through which the display presents images;
light detectors configured to detect a finger touch on the display cover layer;
a light source that emits light; and
a metasurface grating interposed between the light source and the display cover layer, wherein the metasurface grating couples a first portion of the light into the display cover layer at a first angle such that the first portion of the light is guided within a first region of the display cover layer via total internal reflection, wherein the metasurface grating couples a second portion of the light into the display cover layer at a second angle such that the second portion of the light is guided within a second region of the display cover layer via total internal reflection, and wherein the total internal reflection is locally defeated by the finger touch to scatter the light towards the light detectors.

2. The electronic device defined in claim 1 wherein the light source comprises an array of light-emitting elements.

3. The electronic device defined in claim 2 wherein the light-emitting elements comprise vertical cavity surface emitting lasers that emit the light in different directions.

4. The electronic device defined in claim 3 wherein the metasurface grating comprises a first set of nanostructures optimized to receive light from a first of the light-emitting elements and a second set of nanostructures optimized to receive light from a second of the light-emitting elements.

5. The electronic device defined in claim 1 wherein the metasurface grating comprises nanoposts.

6. The electronic device defined in claim 5 wherein the nanoposts comprise first elliptical nanoposts having a first size and second elliptical nanoposts having a second size that is larger than the first size.

7. The electronic device defined in claim 6 wherein the first elliptical nanoposts and the second elliptical nanoposts have respective major axes that are parallel to each other.

8. The electronic device defined in claim 1 further comprising an additional metasurface grating on the display cover layer, wherein the light propagating within the display cover layer is incident upon the additional metasurface grating and redirected by the additional metasurface grating.

9. The electronic device defined in claim 8 wherein the additional metasurface grating is located adjacent to an edge of the display cover layer and wherein the additional metasurface grating redirects the light away from the edge.

10. The electronic device defined in claim 9 wherein the additional metasurface grating has at least one property that varies along a length of the edge.

11. The electronic device defined in claim 1 wherein the metasurface grating comprises nanostructures formed from a first material having a first refractive index and encapsulated with a second material having a second refractive index that is lower than the first refractive index.

12. An electronic device, comprising:
a display;
a display cover layer through which the display presents images;
light detectors configured to detect a finger touch on the display cover layer;
a light source that emits light into the display cover layer, wherein the light is guided within the display cover layer via total internal reflection; and
a metasurface grating on a lower surface of the display cover layer, wherein the light within the display cover layer is incident upon the metasurface grating and is redirected by the metasurface grating to sustain the total internal reflection and wherein the total internal reflection is locally defeated by the finger touch to scatter the light towards the light detectors.

13. The electronic device defined in claim 12 wherein the metasurface grating comprises nanoposts.

14. The electronic device defined in claim 13 wherein the nanoposts comprise first elliptical nanoposts having a first size and second elliptical nanoposts having a second size that is larger than the first size.

15. The electronic device defined in claim 14 wherein the first elliptical nanoposts each have a first major axis and the second elliptical nanoposts each have a second major axis and wherein the first major axis is perpendicular to the second major axis.

16. The electronic device defined in claim 12 wherein the display comprises pixels that serve as the light detectors.

17. An electronic device, comprising:
a display;
a display cover layer through which the display presents images;
light sensors configured to detect a finger touch on the display cover layer;
an array of light-emitting elements that emit light in different directions towards a lower surface of the display cover layer; and
a metasurface grating interposed between the array of light-emitting elements and the display cover layer, wherein the metasurface grating couples the light into the display cover layer at an angle such that the light propagates within the display cover layer via total internal reflection, wherein the metasurface grating comprises first and second non-overlapping metasurface structures, wherein the first metasurface structures are optimized to receive the light from a first of the light-emitting elements and the second metasurface structures are optimized to receive the light from a second of the light-emitting elements, and wherein the total internal reflection is locally defeated by the finger touch to scatter the light towards the light sensors.

18. The electronic device defined in claim 17 wherein the display comprises pixels that serve as the light sensors.

19. The electronic device defined in claim 17 wherein the metasurface grating comprises first elliptical nanoposts having a first size and second elliptical nanoposts having a second size that is larger than the first size.

20. The electronic device defined in claim 17 wherein the light-emitting elements comprise vertical cavity surface emitting lasers.

* * * * *